United States Patent [19]

Erickson

[11] 4,290,889
[45] Sep. 22, 1981

[54] SUPPORT FOR BACKFLUSHABLE FILTER MEDIA

[75] Inventor: Arnold R. Erickson, Orange City, Fla.

[73] Assignee: Brunswick Corporation, Skokie, Ill.

[21] Appl. No.: 115,031

[22] Filed: Jan. 24, 1980

[51] Int. Cl.³ .................. B01D 27/06; B01D 29/32
[52] U.S. Cl. .................................... 210/484; 55/498; 55/521; 210/490; 210/492; 210/493.2; 210/510
[58] Field of Search ................... 55/498, 500, 521; 210/483–485, 488–491, 493, 496, 510

[56] References Cited

U.S. PATENT DOCUMENTS

| Re. 27,466 | 8/1972 | Rosaen et al. | 210/485 X |
|---|---|---|---|
| 2,593,293 | 4/1952 | Giaugue | 210/493 |
| 2,675,127 | 4/1954 | Layte | 210/489 X |
| 2,837,214 | 6/1958 | Kasten | 210/484 X |
| 3,007,579 | 11/1961 | Pall | 210/489 |
| 3,058,593 | 10/1962 | Gruner | 210/493 |
| 3,321,088 | 5/1967 | Williamitis | 210/489 |
| 3,696,592 | 10/1972 | Engleman | 55/500 |
| 3,994,810 | 11/1976 | Schaeffer | 210/103 |
| 4,075,106 | 2/1978 | Yamazaki | 210/493 X |
| 4,089,783 | 5/1978 | Holyoak | 210/493 X |
| 4,104,170 | 8/1978 | Nedza | 210/491 X |
| 4,114,794 | 9/1978 | Storms | 55/498 X |
| 4,169,059 | 9/1978 | Storms | 210/493 |
| 4,172,797 | 10/1979 | Robichaud et al. | 210/493 X |
| 4,181,514 | 1/1980 | Lefkowitz et al. | 55/521 X |

Primary Examiner—Robert H. Spitzer
Attorney, Agent, or Firm—John G. Heimovics

[57] ABSTRACT

This invention comprehends a new and unique means for preventing the crowns of a backflushable filter element unit from splitting which has heretofore been caused by the cyclic action of the cleaning and backflushing. A layer of staple material is positioned adjacent the outer layer of filter media to prevent bellowing or ballooning. An additional staple layer may be positioned adjacent the inner layer of filtered media to provide additional support. With both staple layers in position on both sides of the filter media, the media is firmly captured and the crowns will not split.

21 Claims, 14 Drawing Figures

SUPPORT FOR BACKFLUSHABLE FILTER MEDIA

BACKGROUND OF THE INVENTION

1. Field of the Invention

This invention relates to filter elements, and more particularly, to filter elements used in backflushable filter units wherein the filters suffer from premature failure due to the filtering-cleaning cycle imposed thereon. The invention comprehends a means for limiting this premature failure by incorporating a novel support system during the manufacturing of the filter.

2. Background of the Prior Art

In U.S. Pat. No. 3,994,810, a backflushable filter unit having a plurality of filter elements is taught. The filter elements therein are depicted as being cylindrical with pleated filter media being secured to the end caps of the filter elements. The preferred filter media for filtering polymers is mentioned as a metal fiber depth filter media wherein the metal fibers have a diameter from about 1 micron to about 50 microns and the media is sintered.

Generally, in the operation of filter units and including backflushable units, the flow of contaminated fluid is usually from outside the filter element into the center of the element and then out through the center of the filter housing. However, in backflushable filter units, the flow is preselectedly reversed so that some of the cleaned fluid is used for flowing from inside the filter element to its outside thereby cleaning the filter media.

In such backflushable filter units, the filters are on-stream filtering for a preselected period of time and then selectively switched off-stream either individually or in pairs being cleaned for a preselected period of time. The cleaning period or time required to clean the filters is dependent upon:

(1) how dirty the filters are;
(2) the type of fluid in the system;
(3) the type of contaminants;
(4) the amount of pressure drop in the device; and
(5) the desired level of cleanness.

The filtering and cleaning causes the pleated filter media of the filter elements to be subjected to cyclic pressure and flow. It has been found that under certain circumstances, such as a high differential pressure across the filter media caused by a high viscosity fluid being filtered, that the crowns of the pleats of some of the elements in a backflushable unit were cracking or splitting such as depicted in the photograph of FIG. 1.

It was initially believed that this splitting of the crowns was due to failure of the fastening means that was used to attach the pleated filter media to the end caps. A number of such filter elements were made in accordance with U.S. Pat. No. 4,169,059 wherein a metal fiber web is used as the means for bonding the filter media to the end caps. An extensive evaluation of a plurality of the filter elements, such as those depicted in FIG. 1, indicated that the bonding means for securing the pleated filter media to the end caps was fully intact. Therefore, bonding failure was not the cause of the splitting of the crowns.

Thus, recognition of the splits in the crowns and a review of the prior art techniques did not lead one to any conclusion as to how to solve the splitting problem.

SUMMARY OF THE INVENTION

This invention relates to filter elements, and more particularly, filter elements that are used in backflushable filtering units and contemplates a means for preventing the crowns of the pleats of the filter elements from cracking or splitting because the media is subjected to repeated cycles of filtering and backflushing.

It is therefore an object of this invention to provide means mounted between the outer media pleats for preventing diaphragmic movement of the filter pleats when fluid is forced through the media in a cyclic fashion.

It is another object of this invention to provide such a means which comprises anti-bellowing means preventing movement of the filter media.

It is yet another object of this invention to provide for reinforcement of the filter media.

It is still another object of this invention to provide an anti-bellowing means that comprises a three-dimensional, randomly oriented array of staples forming a layer with such layer being positioned between the outer pleats of the filter media.

It is yet still another object of this invention to provide an anti-bellowing means that comprises a three-dimensional randomly oriented array of staples forming a layer with such layer supporting the inner layer.

The above and other and further objects and features will be more readily understood by reference to the following detailed description and accompanying drawings.

DESCRIPTION OF THE PREFERRED EMBODIMENTS

Figure 2:
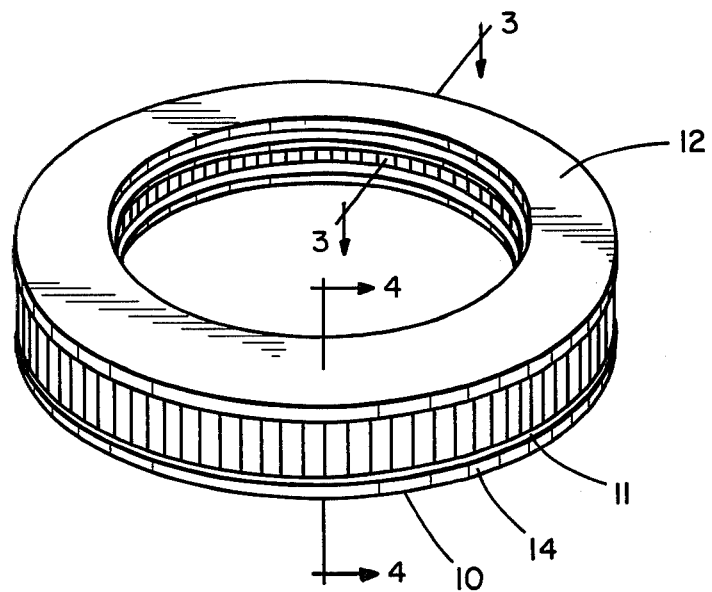
FIG. 2 is a perspective view of one style of filter element that can be used in a backflushable filter unit.
Figure 3:
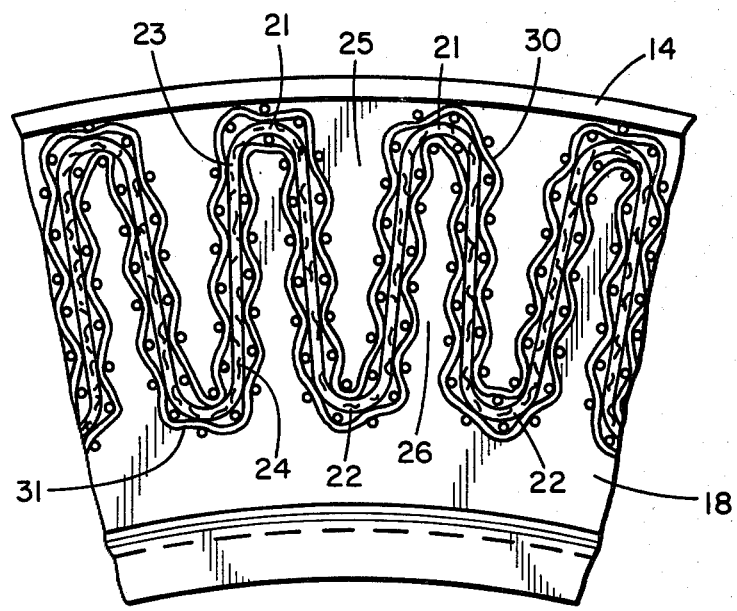
FIG. 3 is a cross-sectional view taken along line B—B of FIG. 2 comprising a portion of the prior art filter element.
Figure 4:
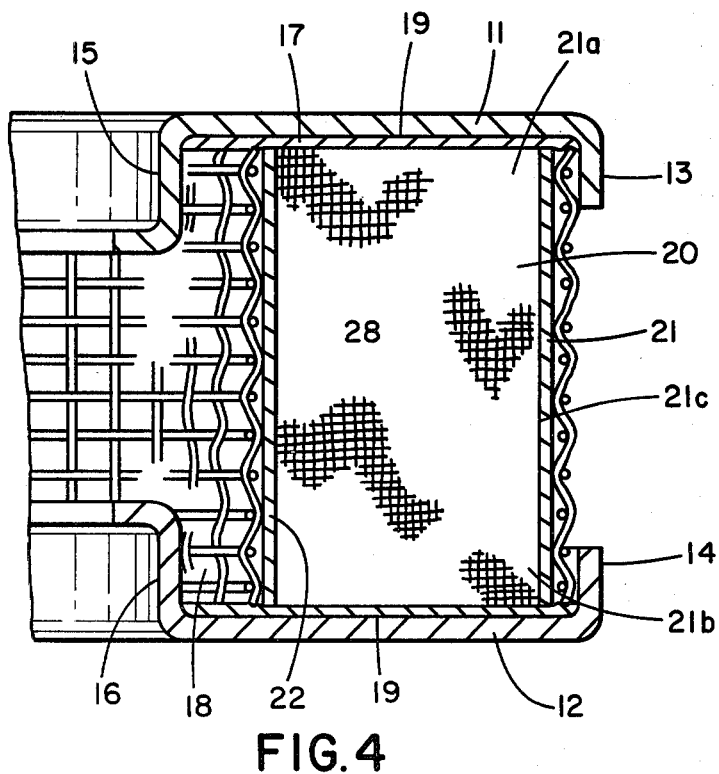
FIG. 4 is a cross-sectional view taken along line A—A of FIG. 2 indicating the location of the filter media and filter end caps.

A small perspective representation of a filter element is shown in FIG. 2 with FIG. 3 depicting a segment of the lower portion of the filter element of FIG. 2 taken along line B—B. The filter media 20 has pleats 27 with crowns 21 and apexes 22. The filter media 20 is secured to the end caps 11 and 12 by bonding means 19 such as taught in U.S. Pat. No. 4,114,794. The upper end cap 11 has a forward lip 13 and an inner lip 15 with gap 17 between the apexes 22 and lip 15. And, the lower cap 12 has a forward lip 14 and an inner lip 16 with gap 18 between the apex 22 and the lip 16. The crown 21 is extremely close to the forward lips 13 and 14 and in some instances when the bonding means 19 actually falls over the edge of the lip the very top edge of the crown 21 can be secured at 21a and 21b. The filter element 10 will be of any size compatible with the filter housing used to hold it.

Figure 1:
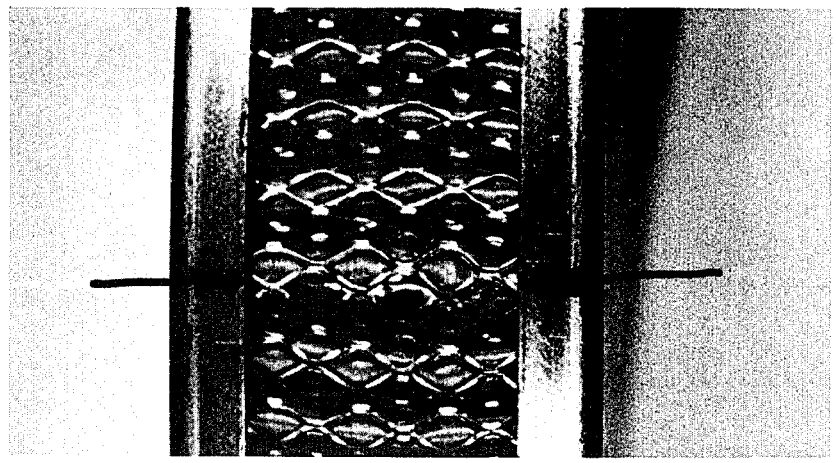
FIG. 1 is a photographic representation of a partial segment of a prior art filter element depicting a split crown indicated by opposing arrows.
Figure 5:
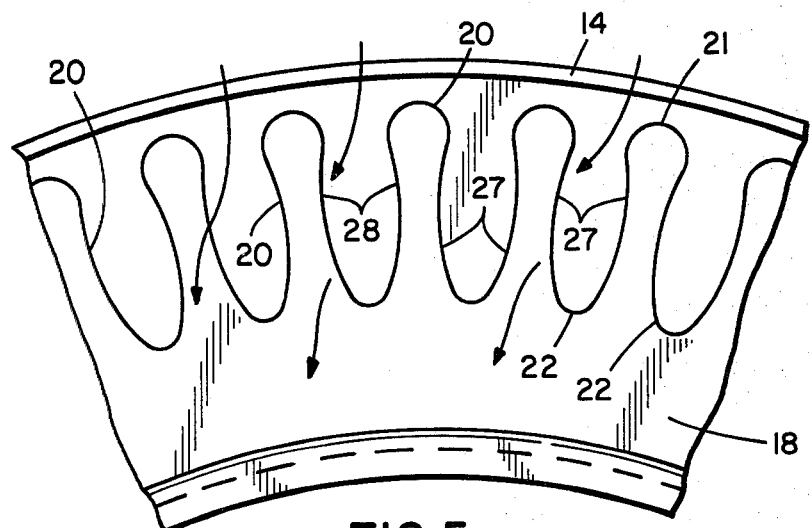
FIG. 5 is a partial cross-sectional view taken along line B—B and represents the prior art filter element during its normal filtering cycle and depicting the filter media bellowing or ballooning inwardly toward the center of the filter.
Figure 6:
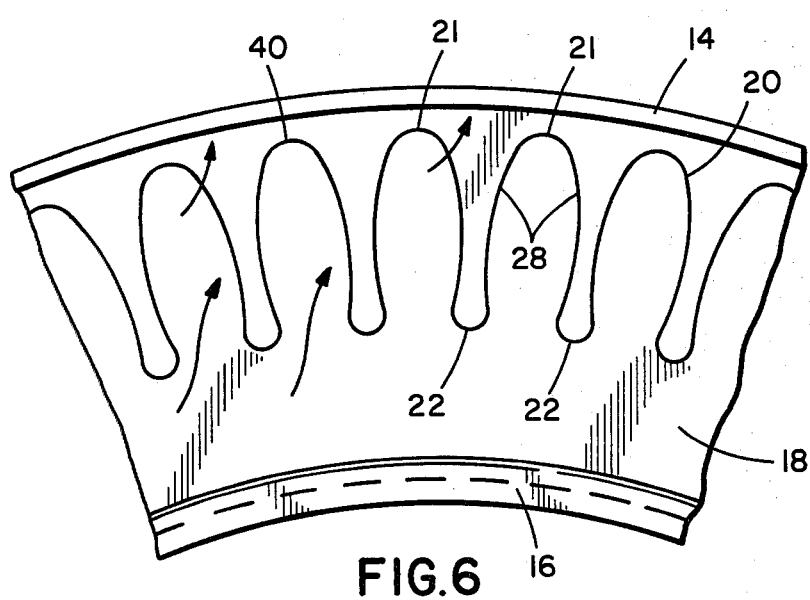
FIG. 6 is a partial cross-sectional view taken along line B—B of FIG. 2 and represents the prior art filter during a backflushing portion of a cycle depicting the filter media as slightly bellowing or ballooning outwardly.

It was found after the invention herein that when the filter element 10 is normally filtering in a backflushable filter unit such as that taught by U.S. Pat. No. 3,994,810 that the filter media 20 appears to balloon slightly inward such as shown in FIG. 5. In fact, in a backflushable unit where fluid is forced both ways through the filter media, it is thought that such filter media pleats 28 act as diaphragms wherein the adjacent pleats 27 (those separated by apexes 22) are forced apart during the normal filtering cycle. The arrows in FIG. 5 represent the fluid flowing through the filter media. When the flow is reversed and the filter is being backflushed or cleaned, the filter media pleats 27 (again those separated by apexes 22) are forced together such as shown in FIG. 6; the arrows indicating the path of the flow of the fluid. Thus, the filtering and backflushing cycle causes the pleats 27 to move in and out, mostly at their center 28, in a diaphragmic movement without breaking their seal with the bonding means to the end caps. The top crown 21a and bottom crown 21b are restricted from movement due to the relative closeness to and support provided by lips 13 and 14. It is therefore believed that the location of maximum stress due to this diaphragmic movement is located in the crown 21 and possibly at the center 21c. This diaphragmic movement seems to prematurely cause one or more of the crowns to split open when the fluid passing through the filter unit has a high viscosity and there is a high pressure drop across the filter material. The photograph of FIG. 1 depicts a portion of part of a filter element used in a backflushable filter unit such as the backflushable unit shown in U.S. Pat. No. 3,994,810. A cross-sectional view of a split crown 21 similar to that shown in FIG. 1 is shown in FIG. 6 at 40. When this split occurs, the filter unit becomes inoperable because contaminated fluid can pass through this breach without being filtered. It has been ascertained that the splitting crowns will occur more when fluid having a viscosity of approximately 1000 poise or more is being filtered and the pressure drop across the filter media is about 150 psia or more.

In a typical construction of the backflushable element 10 as shown in partial cross-section in FIG. 3 the filter media 20 can be made from a metal fiber web material that is sintered. This filter media 20 may be faced on its outer surface 23 by an outer metal wire screen 30. Sometimes, the media 20 may also be faced on the inner surface 24 by a metal wire screen 31. These wire screens 30 and 31 are generally lightweight metal screens; typically, these screens are 24×24 mesh made of 11 mil wire, 16×16 mesh made of 18 mil wire and 10×10 wire mesh made from 25 mil wire. Expanded metal sheets having a thickness of from about 20 mils to about 30 mils may be substituted for the metal screen wire. The size of the screen or expanded metal is predicated on (1) the size of the filter element, (2) the number of pleats of the element and (3) the size of a pleat in order to be compatible therewith.

Figure 7:
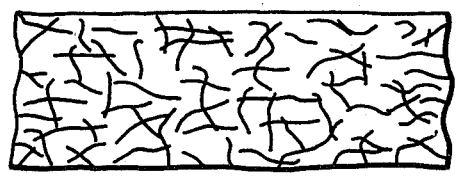
FIG. 7 is a partial side elevation view of the inventive layer described herein.
Figure 8:
FIG. 8 is a partial edge view of the material depicted in FIG. 7.

Quite surprisingly, it has been found as a preferred embodiment of the invention that an anti-bellowing means that prevents the diaphragmic movement of the pleats 22 may be comprised of a three-dimensional, randomly oriented array of metal staples forming a layer that can be placed adjacent the outer surface 23 of the media 20. Such a layer 50 is shown in FIGS. 7 and 8 comprise a plurality of staples.

As used herein, the term "staple" means short strands of predetermined length range (although they can be random lengths) of fibers, strands, filaments and of the size range that is common with the full spectrum of textile staple fibers both in length and diameter. Preferably, the staple fibers of predetermined length range are staple metal fibers, cut wires and metal cuttings including cut metal wool and metal turnings, but not limited thereto. It is fully contemplated that although the length of the staples are predetermined range they can also be of random length in a particular layer. Preferably, the staples of the layer can have a length ranging from ¼ inch to 6 inches (similar to textile staple fibers) and more preferably, about ⅜ inch to 1¼ inch. It has been found that the staples are sometimes broken into shorter lengths when being made into the randomly oriented layer 50. The diameter of the staples can vary anywhere from about 20 microns to about 250 microns; the diameter of the fibers used in a layer 50 are partially predicated by (1) the size of the individual pleat area, (2) the number of pleats in filter element, (3) the fluid to be filtered, (4) the pressure drop across the filter, and (5) the viscosity of the contaminated fluid to be filtered. The layer 50 can be made of textile-type metal staples and made into a nonwoven (in a classical sense) metal layer. It is also fully contemplated that the layer can be made of kinked wire staples. The layer 50 exhibits flexibility and some resiliency which is, in part, controlled by the size of the staples. Layer 50 also can be sintered in order to bond some of the staples to each other. Some of the techniques for making such a metal layer and the fibers contained therein can be found in U.S. Pat. Nos. 3,379,000; Re 28,470; 3,505,038; 3,505,039; 3,277,564; 3,394,213; 3,469,297; 3,504,516; 3,540,114; 3,632,027; 3,705,021; 3,977,069; 3,977,070; 4,118,845; just to name a few.

In a preferred embodiment of the invention, a metal layer 50 is made from metal staples 51, such as precut lengths of wire that are subsequently kinked, metal fibers or cut metal shavings; the metal staples are sintered in the layer at their points where the staples touch each other. The sintering can be accomplished as described in some of the prior art patents previously referred to; the temperatures and furnace atmospheres depending on the type of metal to be sintered.

Typically, the layer 50 and the filter media 20 should be made of compatible materials, and when the filter media and layer are made of metals, they can be made of such materials such as stainless steel, super alloys, nickel based alloys, and the like, but not limited thereto. The selection of the materials for the layer 50 and the media 20 is predicated by the fluid to be filtered and the contaminant to be removed from the fluid.

After the layer 50 is sintered, it is rolled to the desired thickness in density. For filter elements where the pleats 27 are from about one square inch in area to about two square inches in area, the layer 50 preferably has a density from about 10% to about 30% and more preferably 14% to 20%. Obviously the layer must have a pore size that is greater than the filter material otherwise it will perform, too much, as a prefilter layer. A preferred thickness range of the layer is from about 1/32 inch (31 mils) to about 3/32 inch (93 mils) and, of course, depends on the distance between the outer surfaces of the pleats which may or may not include adjacent screen material.

Figure 9:
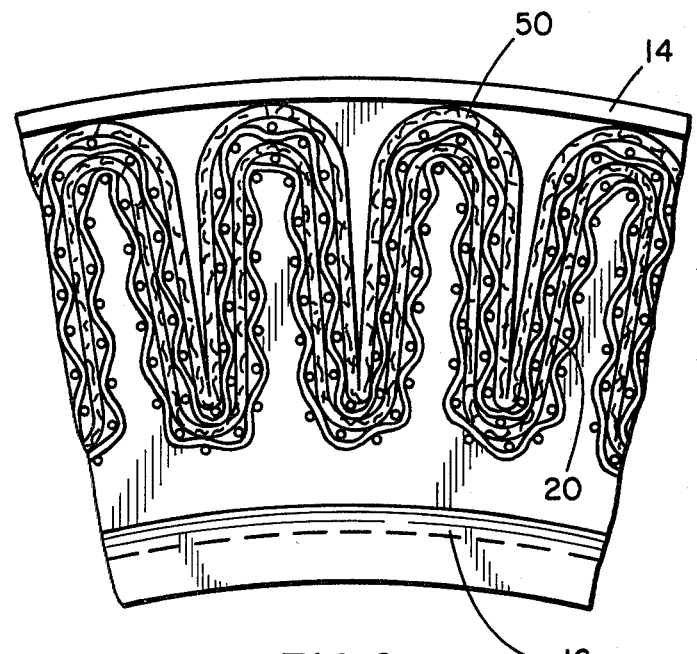
FIG. 9 is a partial cross-sectional view taken along line B—B of FIG. 2 depicting one embodiment of the invention.

This layer 50 is packed between the outerfacing pleats 27 and not only reinforces the filter media but provides a semi-rigid layer 50 between the outer surface 23 of the pleats 27, as shown in FIG. 9. This porous layer 50 prevents the outward bellowing or outward diaphragmic movement of the media 20 when it is being backflushed. The density of the layer 50 is selected so that it does not interfere with the filtering aspects of the media 20 or the subsequent backflushing that the media 20 experiences.

In the manufacture of the filter it has been found that the layer 50 can easily be pleated (after it is sintered and compressed) along with the media 20 and the screen wire 30 (if the screen wire is used). The filter element is assembled in a manner such as shown in U.S. Pat. No. 4,114,794, although other means of bonding the media and the layer to the end caps 11 and 12 are fully contemplated herein. During assembly, the layer 50 is tightly compacted on itself such as shown in FIG. 9. The compacted metal staple layer 50 has very little surface resiliency since it is compacted after sintering; thus, it is defined as having the ability to resist compaction in its thinner dimension "a" (as shown in FIG. 8). The layer 50 ably prevents the anti-bellowing or diaphragmic movement of the media once the filter element containing the invention is assembled and placed into use.

Figure 10:
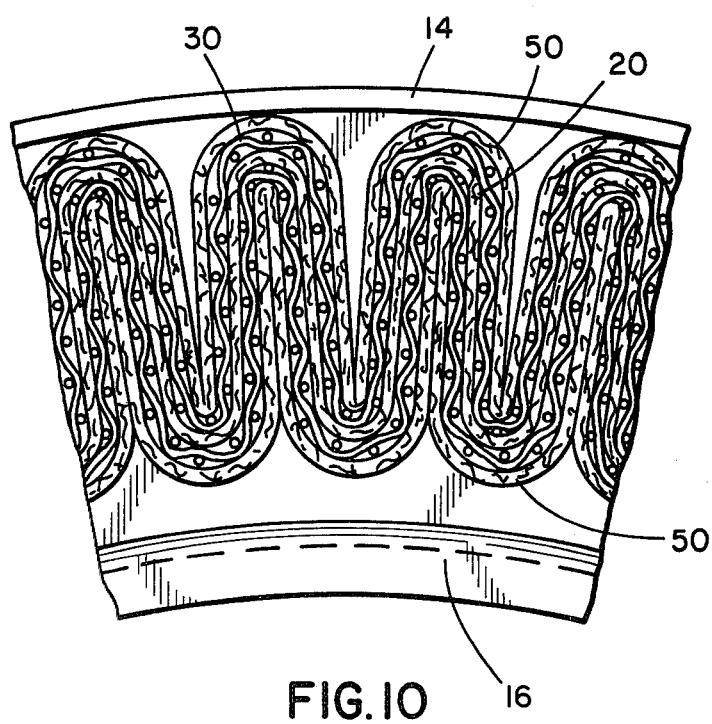
FIG. 10 is a partial cross-sectional view taken along line B—B of FIG. 2 depicting another embodiment of the invention hereof.

In another embodiment of the invention as shown in FIG. 10 a layer 50a, similar to layer 50, can be positioned adjacent the inner surface 24 of the media 20. This lightweight, low density porous layer 50a supports the media 20 from the inward anti-bellowing or diaphragmic movement when the filter element is in the filtering mode. This combination of support layers 50 and 50a completely entraps the media 20 permitting it to perform its filtering function and permitting the media to be cleaned by backflushing and yet not interfering with the filtering function.

The following filter elements 20 were manufactured with each having an outside diameter of about 8½ inches, an inside diameter of about 5½ inches, a filter media having a pleat height of about 1¼ inch and a thickness between end caps 11 and 12 of about 1⅛ inches. The end caps on all five filter elements were bonded to the media in accordance with U.S. Pat. No. 4,114,794.

EXAMPLE I

The element had filter media made from a sintered metal fiber web having a thickness of 25 mils and a density of approximately 20%. Adjacent the outer surface of the media was a layer of 24×24 wire mesh screen having wires 11 mils in diameter. Adjacent the inner layer of the media was a 10×10 screen wire made of a 25 mil diameter wire. The element had 108 pleats with a filter media area of 1.9 square feet.

EXAMPLE II

The element had filter media made from a sintered web of metal fiber having a thickness of about 15 mils and a density of about 20%. Adjacent the outer surface of the media was a layer of 16×16 metal wire screen made from a wire having a diameter of 18 mils. Adjacent the inner layer of the media was a 16×16 screen wire material made from wire having an 18 mil diameter. The filter element had 120 pleats with a filter media area of 2.12 square feet.

EXAMPLE III

The filter element had filter media from a sintered metal fiber web having a thickness of approximately 15 mils and a density of about 20%. Adjacent the outer surface of the media was a layer of expanded metal approximately 30 mils thick and having openings approximately ⅛ inch×¼ inch. Adjacent the inner layer of the media was a layer of expanded metal approximately 30 mils thick and having openings of about ½ inch×¼ inch. This element had 133 pleats with a filter media area of about 2.34 square feet.

EXAMPLE IV

The element had filter media made from a sintered metal fiber web having a thickness of about 15 mils and a density of about 20%. There was nothing adjacent the outer surface of the media. Adjacent the inner surface of the media was a layer of expanded metal approximately 30 mils thick and having openings of about ⅛ inch×¼ inch. The filter element had 126 pleats and a filter media area of 2.22 square feet.

EXAMPLE V

The element had filter media made from a sintered metal fiber web having a thickness of about 15 mils and a density of about 20%. Adjacent the outer surface of the media was a layer of 100×100 wire screen material made from a wire having an 4.5 mil diameter. Adjacent the inner layer of the media was a 100×100 metal wire screen made from a wire having a diameter of about 4.5 mils. Adjacent the outer screen wire was a 1/32 inch thick sintered metal staple layer made of staples having a diameter of about 6 mils and, adjacent the inner screen wire was a 1/32 inch thick sintered metal staple layer made of staples having a diameter of about 6 mils also. The sintered metal staple layers were tightly compacted and arranged similar to the partial cross-sectional view shown in FIG. 10. The outer layer had a density of about 19.5% and the inner layer had a density of about 19.5%. The filter had 105 pleats and a filter media area of about 1.85 square feet.

Examples I–IV all had a cross-sectional arrangement similar to that shown in the partial view of FIG. 3 and Example V has a cross-sectional arrangement similar to FIG. 10. All five examples were tested in a back-flushable unit simulator and subjected to the same cyclic flow of silicone oil having a viscosity of about 1000 poise. Each filter element was subjected to a differential pressure of approximately 150 psia. The filters were checked periodically to see whether or not there was any splitting at the crown. The following table indicates the results of these tests.

| Example No. | Type of Filter | Cycles Before Crown Splitting |
|---|---|---|
| I | Prior Art | 900 |
| II | Prior Art | 400 |
| III | Prior Art | 250 |
| IV | Prior Art | 1350 |
| V | The Invention | 10,000* |

*Test stopped after 10,000 cycles, filter still intact (no crown split).

The results achieved from the invention hereof are quite surprising and cannot be fully explained by the inventor. Why the synergistic effect of the 1/32 inch metal layers supporting the filter media achieved approximately a nine times better performance than the best prior art filter cannot fully be explained but it is believed that preventing the anti-bellowing movement of the media prevents the splitting of the crowns.

Figure 11:
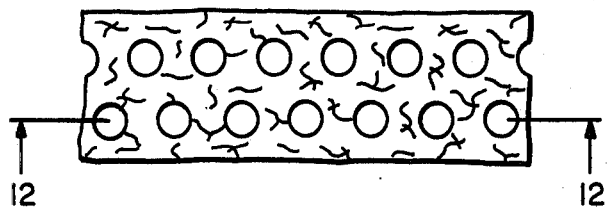
FIG. 11 is a partial side elevation view of another embodiment of the invention described herein.
Figure 12:
FIG. 12 is a partial edge view of the embodiment shown in FIG. 11.

In other embodiments of the invention, means for making the layer lighterweight, and thus cheaper, have been found without altering the effectiveness of the layer's performance. One such embodiment is shown in FIGS. 11 and 12 wherein the layer 52 has preselectedly holes 53 making the layer more porous without changing its strength or other physical characteristics except for its weight and total density.

Figure 13:
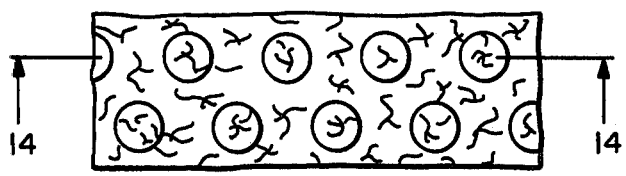
FIG. 13 is a partial side elevation view of another embodiment of the invention described herein.
Figure 14:
FIG. 14 is a partial side edge view of the embodiment shown in FIG. 13.

In another embodiment of the invention, the layer 54 shown in FIGS. 13 and 14 has a plurality of dimples 55. The dimples function to provide a thicker material (dimension "b") with less material. It is yet another embodiment of layer 50 to be corrugated such as corrugated sheet metal but on a much smaller scale in order to provide a greater thickness without increased weight. It has been found desirable to have these corrugations spaced approximately ⅛ inch apart. The corrugated layer and the layers 52 and 54 can be substituted for the layer 50 as desired. In another embodiment, the layer 50 can be a semi-rigid knitted wire. Further, it has been found that depending upon the size of the filter media and the pressure drop across the filter one metal staple supporting layer 50 has been found suitable in many instances thus, not requiring the extra inner layer.

Although specific embodiments of the invention have been described, many modifications and changes may be made in the device without departing from the spirit and the scope of the invention as defined in the appended claims.

What is claimed is:

1. A fluid filter comprising:
 (a) a pair of spaced end caps;
 (b) a pleated filter material extending between the end caps and secured thereto, the media having inner and outer pleated surface, the outer pleats having outwardly projecting crowns, the media having a pore size of X and a density of Y; and,
 (c) anti-bellowing means mounted between the outer media pleats for preventing the diaphragmic movement of the filter pleats when fluid is forced through the media in cyclic fashion, the anti-bellowing means comprising a plurality of metal staples in a three-dimensional, randomly oriented array forming a layer, the layer having a density less than Y and a pore size greater than X whereby the primary function of the layer is not that of a filter media.

2. The filter of claim 1 further including a pervious material adjacent a substantial portion of the outer pleated surface.

3. The filter of claim 2 wherein the pervious material is woven wire mesh.

4. The filter of claim 2 wherein the pervious material is sinter bonded to the filter media.

5. The filter of claim 1 or 2 further including a pervious material adjacent a substantial portion of the inner pleated surface.

6. The filter of claim 5 wherein the pervious material is woven wire mesh.

7. The filter of claim 5 wherein the pervious material is bonded to the filter media.

8. The filter of claim 1 wherein the layer is sintered and a substantial portion of the staples are bonded at crossover points where the staples touch.

9. The filter of claim 8 wherein the staples have an effective diameter from about 25 microns to 250 microns.

10. The filter of claim 9 wherein the layer can be substantially all of the same size staples.

11. The filter of claim 9 wherein the layer can be a mixture of staple sizes.

12. The filter of claims 1 or 8 wherein the layer is flexible and can be pleated.

13. The filter of claim 1 wherein the outer surface of the layer is pleated and the layer pleats are compressed between the media pleats forming a two-layered spacer between the outer pleats of the media.

14. The filter of claim 13 wherein the layer pleats compacted between the media pleats have substantially no compactability created when the fluid is forced through the layer and the media in a cyclic fashion.

15. The filter of claim 1 wherein the layer has a density ranging from about 10 percent to about 30 percent.

16. The filter of claim 15 when the layer has a thickness ranging from about 1/32 inch to about 3/32 inch.

17. The filter of claim 1 wherein the layer is perforated holes.

18. The filter of claim 17 wherein the size of the hole range from 15 mils. to 25 mils.

19. The filter of claim 1 wherein the layer is dimpled.

20. The filter of claim 1 wherein the layer is corrugated.

21. The filter of claim 20 wherein the corrugations are spaced no more than ⅛ inch apart.

* * * * *